United States Patent [19]

Myers et al.

[11] 4,396,497

[45] Aug. 2, 1983

[54] HYDROCARBON TREATMENT

[75] Inventors: John W. Myers; Daniel J. Strope, both of Bartlesville, Okla.

[73] Assignee: Bar Phillips Petroleum Company, Bartlesville, Okla.

[21] Appl. No.: 293,066

[22] Filed: Aug. 17, 1981

[51] Int. Cl.³ .............................................. C10G 35/06
[52] U.S. Cl. .................................... 208/135; 423/630
[58] Field of Search ......................... 423/630; 208/135

[56] References Cited

U.S. PATENT DOCUMENTS

| | | | |
|---|---|---|---|
| 3,531,542 | 9/1970 | Myers et al. | 585/324 |
| 3,558,733 | 1/1971 | Myers | 585/671 |
| 3,558,734 | 1/1971 | Myers | 585/671 |
| 3,631,219 | 12/1971 | Myers | 585/312 |
| 3,781,377 | 12/1973 | Myers | 585/315 |
| 3,852,190 | 12/1974 | Buss et al. | 208/138 |
| 4,051,017 | 9/1977 | Beaty, Jr. | 208/135 |
| 4,225,419 | 9/1980 | Myers | 208/135 |

OTHER PUBLICATIONS

Asinger, *Mono-Olefins Chemistry and Technology* Pergamon Press, New York, (1968), p. 1094.

*Primary Examiner*—Curtis R. Davis

[57] ABSTRACT

A process for the treatment of gasoline boiling range hydrocarbons to increase the octane number thereof comprising contacting same with a gamma alumina catalyst derived from the hydrolysis of aluminum alkoxides.

5 Claims, No Drawings

HYDROCARBON TREATMENT

This invention relates to the treatment of hydrocarbon fractions to improve the properties thereof. In accordance with another aspect, this invention relates to the treatment of gasoline boiling range hydrocarbon feedstocks to increase the octane number thereof by contacting with a gamma alumina catalyst. In accordance with a further aspect, this invention relates to the use of a gamma alumina catalyst derived from the hydrolysis of aluminum alkoxides for the treatment of gasoline fractions to improve the octane number of the hydrocarbon fraction being treated.

Hydrocarbon fractions are produced which contain components which affect the properties of the particular hydrocarbon fraction under consideration. The history of the petroleum industry is a study in the continuing effort to convert various hydrocarbon fractions to more desirable products. Many processes utilize catalysts which are known for converting hydrocarbons into more desirable components. Catalysts specifically tailored to produce particular results have been developed and the search is continuing for improved catalysts having improved effectiveness and improved selectivity for converting hydrocarbon fractions into more desirable products.

Accordingly, an object of this invention is to provide an improved process for the treatment of hydrocarbon fractions.

Another object of this invention is to provide a process for producing gasoline fractions having increased octane numbers.

A further object of this invention is to provide a catalyst exhibiting unexpectedly high and long-lived activity for the treatment of gasoline hydrocarbon fractions.

Other objects, aspects, as well as the several advantages of the invention will be apparent to those skilled in the art upon reading the specification and the appended claims.

In accordance with the invention, gasoline boiling range hydrocarbon feedstocks are treated under conditions which increase the octane number thereof in the presence of a gamma alumina catalyst.

More specifically gasoline boiling range hydrocarbon feedstocks containing at least about 5 wt. % olefin are treated under conditions sufficient to increase the octane number thereof by contacting with a gamma alumina catalyst derived from the hydrolysis of aluminum alkoxides.

This invention contemplates treatment of gasoline boiling range hydrocarbon fractions over a gamma alumina catalyst derived from the hydrolysis of aluminum alkoxides as defined and described in U.S. Pat. No. 4,051,017 which is hereby incorporated by reference. As set forth in said patent the gamma alumina catalyst is produced by a process comprising:
  a. hydrolyzing aluminum alkoxides to produce an aqueous alumina slurry and an organic reaction product,
  b. contacting said aqueous alumina slurry with an effective amount of a suitable organic solvent to form a solvent-aqueous alumina mixture,
  c. evaporating the solvent and water, and
  d. forming said alumina into particles and calcining to produce gamma alumina.

A preferred method for the production of such alumina comprises:
  a. reacting aluminum alkoxides having alkoxy groups containing from about 1 to about 30 carbon atoms in the alkoxide portion with an aqueous alumina slurry and an organic portion;
  b. separating the organic portion and the aqueous alumina slurry;
  c. optionally further purifying the aqueous alumina slurry by solvent extraction, steam stripping and the like to further remove any remaining minor portions of the organic portion; and,
  d. contacting the aqueous alumina slurry with an effective amount of an organic solvent.

The gamma alumina catalyst prepared as described above is used to increase the octane numbers (as determined by both the research and motor methods) of gasoline range hydrocarbon. The hydrocarbon feedstocks normally treated according to the invention, have a normal boiling range from about 10° to about 225° C. In a preferred embodiment, gasoline range hydrocarbons treated according to the invention will have a normal boiling range from about 75° to about 225° C. such as obtained from catalytic cracking. It is believed that the changes effected which result in an increased octane number (ON) involve the olefins contained in the hydrocarbon fraction being treated. The invention is particularly applicable to the treatment of cat cracker gasoline or other olefin-containing gasoline fractions containing at least about 5 wt. % of olefins. The presence of sulfur in the gasoline has no significant effect on this process.

The gasoline boiling range hydrocarbon feedstocks treated according to the invention are subjected to conditions of temperature, pressure and contact time sufficient to increase the octane number of the gasoline fraction being treated. Mode of contact can be fixed or moving, e.g., fluidized catalyst bed. A fixed bed mode of contact is presently preferred.

In general, the temperature for this treatment can range between about 315° to about 510° C., preferably between about 385° to about 425° C.

This process is not particularly sensitive to the pressure at which it is used but elevated pressure can accelerate some undesirable olefin reactions, such as polymerization. Pressure preferably will range from about 100 to 1500 kPa, or even higher. More preferable is the use of pressure between about 200 to 450 kPa.

Contact time of the gasoline range hydrocarbon feedstocks with the alumina catalyst, in terms of volume of liquid hydrocarbon per unit volume of catalyst per hour (LHSV), can range from about 0.15 to 15; preferably it will be between about 0.3 to 5.

When using a fixed bed of catalyst, the direction of flow of the feed can be either up or down. No gas is required to be admixed with the feed. In the practice of this process as described, gasoline yields are high, generally 96 to 99%. About 0.3–0.4 wt. percent of the feed is converted to catalyst deposit and a small amount is cracked to $C_4$ and lighter hydrocarbons. For use as gasoline it may be necessary to separate this light material, e.g., distillation or partial condensation.

In the course of treating hydrocarbons the alumina becomes deactivated by accumulating a deposit of heavy hydrocarbon ("coke"). Its removal by oxidative regeneration restores the catalyst to its original activity. In some instances the catalyst has been found, suprisingly, to be more active to increase ON after regeneration than it was originally. Using a fixed catalyst bed and conditions as defined above, the length of a process cycle will generally be at least 0.5 hour; generally the cycle time will not exceed 15 hours, and usually will not exceed 8 hours. This is determined, however, by the rate of catalyst deactivation and the minimum conversion required.

Catalyst regeneration according to the following procedure has been found to maintain high (and at times increasing) activity and long life. At the conclusion of the process period the catalyst is purged with an inert gas such as nitrogen while its temperature is raised, if necessary, to between about 490°–510° C. Catalyst deposit is removed oxidatively by flowing a stream of gas containing, e.g., about two mole percent oxygen over it. This gas, conveniently prepared by diluting air with an inert gas such as nitrogen, preferably contains about 2.5–3 mole percent water vapor. Length of the regeneration cycle is determined by the quantity of deposit on the catalyst and by the flow rate of the regenerating gas. The phenomenon can be monitored by following the movement of the band of rising temperature as it moves through the catalyst bed in the direction of the gas flow. Complete regeneration within two hours can usually be effected conveniently.

The following example illustrates this invention.

EXAMPLE

Comparative tests were made using two different aluminas to treat cat cracker gasoline. Catalyst I, an example of this invention, was extruded Catapal alumina (prepared as described in U.S. Pat. No. 4,051,017). Catalyst II, a state of the art catalytic grade alumina prepared by other means, was Houdry HA-100S. Table I provides a comparison of some pertinent information about them.

TABLE I

| Catalyst | I | II |
|---|---|---|
| Shape | 1/16" extrudate | 3/32" extrudate |
| Phase | Gamma | Gamma |
| Surface area, m$^2$/g | 219 | 85 |
| Sodium, wt. % | 0.003 | 0.1 |

Runs were made using these two aluminas to treat cat cracker gasolines that are characterized in Table II.

TABLE II

| Gasoline | RON(clear) | MON(clear) | Olefins, wt. % |
|---|---|---|---|
| A | 86.6 | 76.5 | 43.20 |
| B* | 87.5 | 78.1 | 28.99 |
| C | 84.8 | 76.0 | 35.13 |
| D | 88.1 | 77.0 | 40.79 |
| E | 90.1 | 77.8 | 37.71 |

*Initial boiling point about 75° C.

Two essentially identical reaction units were used — one for each of the two alumina catalysts. Unit I contained 88.9 g (about 135 mL) of catalyst I in the extrudate form in which it was received. The 13¾" column of catalyst was covered with about 11" of ⅛" corundum granules which served to preheat the feed, and was supported on a 5" column of the corundum. Unit II contained 64.4 g (about 68 mL) of catalyst II in extrudate form that was disposed in a similar manner, but with more corundum to provide the same volume of solids in each reactor. Catalyst was placed in a 1" pipe reactor mounted vertically in an electrically heated 3-zone furnace. Cat cracker gasoline feedstock, always kept under a nitrogen blanket, was fed from a graduated 2-liter buret with a Lapp pump. After being dried at ambient temperature by passage over a bed of activated molecular sieve the gasoline entered the top of the reactor and flowed down. Effluent from the reactor was cooled in a water-cooled condenser, then exited through a pressure controller. Liquid product from the entire process cycle was accumulated for subsequent determination of its octane number and gas samples were collected periodically for analysis by GLC. All runs were made at 205 kPa pressure and about 670° K unless indicated otherwise. A feed rate of 1.02–1.05 LHSV was used throughout. More details regarding the conditions of the runs are presented in Tables III and IV. Catalyst temperature was measured with a traveling thermocouple, and the average of readings taken at one-inch intervals along the axis of the catalyst bed is recorded in the Tables. The temperature gradient from the center to an end of the catalyst bed was about 8° C.

Process cycles were 5 hours in duration. After that interval the flow of gasoline was stopped and dry nitrogen was passed through the reactor while its temperature was raised to about 490° to 505° C. A stream of air diluted with nitrogen so that the mixture contained about two mole percent oxygen was passed through the reactor to regenerate the alumina. The regenerating gas mixture was saturated with water at about 25° C., thereby adding between about 2.5–3 mole percent of water vapor. This treatment reduces the quantity of coke that is deposited on the catalyst during the subsequent process cycle. Following regeneration, the alumina catalyst was cooled to the desired temperature under flowing dry nitrogen and another cycle of treating cat cracker gasoline was made.

The same portions of Catalysts I and II were used throughout this work, i.e., the catalyst was never replaced with fresh material. Table III presents the sequence in which the five gasoline samples of Table II were treated over Catalyst I in which the product's octane numbers were subsequently measured; Table IV presents the same information for runs over Catalyst II. In only a small fraction of the runs was the liquid product thus analyzed. These samples were subjected to tests according to ASTM D 2699-47 and D 2700-47 for determination of their Research Octane Number (RON) and their Motor Octane Number (MON). With Catalyst II these samples were obtained by combining product from two consecutive cycles because a smaller volume of catalyst was used and the volume of product from a single cycle was insufficient for an engine test. RON reported in Table III and IV have been corrected for the contribution from the experimentally measured C$_4$ content in the samples.

TABLE III

| | Tests with Catalyst I | | | | | |
|---|---|---|---|---|---|---|
| | | RON (MON) increase with gasoline: | | | | |
| Cycle | Temp. °C. | A | B | C | D | E |
| 4 | 395 | 2.3 | | | | |
| 6 | 397 | 2.5 | | | | |
| 21 | 399 | 2.0 | | | | |

TABLE III-continued

Tests with Catalyst I
RON (MON) increase with gasoline:

| Cycle | Temp. °C. | A | B | C | D | E |
|---|---|---|---|---|---|---|
| 26 | 399 | 2.2 | | | | |
| 35* | 398 | 2.2 | | | | |
| 40* | 398 | 2.0 | | | | |
| 42 | 399 | | 1.7 | | | |
| 43 | 398 | | 1.5 | | | |
| 64 | 399 | | | | 2.1 (2.8) | |
| 65 | 399 | | | | 1.9 (2.6) | |
| 84 | 398 | | 1.6 (1.3) | | | |
| 89 | 398 | | | | 2.4 (2.3) | |
| 90 | 398 | 2.0 (2.1) | | | | |
| 98 | 398 | (2.5) | | | | |
| 99 | 398 | 1.4 | | | | |
| 106 | 397 | | 1.9 (1.5) | | | |
| 108 | 398 | | | | 2.3 (3.3) | |
| 109 | 398 | | | | 2.0 (2.5) | |
| 116 | 398 | 2.9 (2.1) | | | | |
| 127 | 399 | 2.2 (2.0) | | | | |
| 134 | 397 | | | | | 1.7 |
| 135 | 398 | | | | | 1.5 |
| 145 | 398 | | | | | 1.0 |
| 163 | 398 | | | 3.8 (1.4) | | |
| 178 | 399 | | | 3.0 (1.8) | | |
| 189 | 398 | | | 3.0 (1.6) | | |
| 199 | 398 | | | 3.3 (2.2) | | |
| 211 | 399 | | | 2.7 | | |
| 212 | 399 | 2.9 | | | | |
| 213 | 400 | 3.0 | | | | |
| 215 | 400 | | 0.9 (0.7) | | | |
| 217 | 399 | | 1.1 (1.3) | | | |
| 220 | 399 | | | | 1.8 (2.4) | |
| 222 | 398 | | | | 2.2 (2.3) | |
| 229 | 398 | | | | | 1.6 (1.7) |
| 233 | 399 | | | | | 1.5 (1.7) |
| 243 | 400 | | | | 2.6 (2.2) | |
| 244 | 400 | | | | 2.6 (2.1) | |
| 246 | 400 | | | | 2.6 (2.0) | |
| 247 | 399 | | 2.1 (0.4) | | | |
| 248 | 399 | | 1.6 (0.6) | | | |
| 250 | 399 | | 1.8 (0.5) | | | |
| Mean RON(MON) increase: | | 2.5 (2.2) | 1.5 (0.9) | 3.2 (1.5) | 2.3 (2.4) | 1.5 (2.1) |

*At 450 kPa pressure

TABLE IV

Tests with Catalyst II

| Cycles | Temp., °C. | A | B | C |
|---|---|---|---|---|
| 2-3 | 398 | 1.7 | | |
| 8-9 | 399 | 1.7 | | |
| 10-11 | 399 | 1.6 | | |
| 18-19 | 398 | 1.6 | | |
| 32-33 | 398 | 1.9 | | |
| 34-35 | 400 | | 1.8 | |
| 36-37 | 401 | | 0.3 | |
| 55-56 | 398 | | 1.0 (0.2) | |
| 110-111 | 398 | | 0.8 (0.8) | |
| 114-115 | 397 | 1.6 (1.8) | | |
| 125-126 | 398 | 0.5 (1.1) | | |
| 133-134 | 399 | 0.1 (0.3) | | |
| 135-136 | 399 | 0.1 (1.0) | | |
| 162-163 | 398 | | | 1.2 (0.5) |
| 182-183 | 398 | | | 1.4 (1.0) |
| 203-204 | 397 | | | 1.0 (0.8) |
| 236 | 398 | | | 0.3 (−0.2) |
| Mean RON(MON) increase: | | 1.2 (1.0) | 1.0 (0.5) | 1.0 (+0.5) |

In both Tables III and IV the mean value of the increase in octane numbers for each gasoline composition has been calculated. It is apparent that the gasolines differ considerably in their susceptibility to improvement by the process and catalyst of this invention. Runs made over Catalyst I (the inventive catalyst) presented in Table III show no appreciable loss of activity during the course of the measurements and, particularly with gasolines A and D, the largest increase in RON was observed after the catalyst had undergone many process and regeneration cycles. The number of runs with gasolines B and C over Catalyst II (Table IV) may be too small to detect such trends, but the runs with gasoline A indicate a substantial loss in activity over a comparable period of time.

A direct comparison of the two different catalysts can be made by comparing the mean RON increase they effected in gasolines A, B, and C. As shown in Table III these were 2.5, 1.5 and 3.2, respectively, over the inventive catalyst. Over the control catalyst the values are 1.2, 1.0 and 1.0 respectively, at identical experimental conditions. It is apparent that Catalyst I is more effective to improve the RON of cat cracker gasoline.

We claim:

1. A process for the treatment of a gasoline boiling range hydrocarbon feedstock containing at least about 5 wt. % olefin to increase the octane number thereof which comprises contacting the feedstock with a catalyst consisting essentially of gamma alumina derived from the hydrolysis of aluminum alkoxides under conditions which increase the octane number of the feedstock, said gamma alumina having been produced by a process comprising:

(a) hydrolyzing aluminum alkoxides to produce an aqueous alumina slurry and an organic reaction product, (b) contacting said aqueous alumina slurry with an effective amount of a suitable organic solvent to form a solvent-aqueous alumina mixture,
(c) evaporating the solvent and water, and
(d) forming said alumina into particles and calcining to produce gamma alumina.

2. A process according to claim 1 wherein the temperature during said contacting ranges from about 315° to about 510° C. and the pressure ranges from about 100 to about 1500 kPa.

3. A process according to claim 1 wherein said feedstock has a normal boiling range from about 10° to about 225° C.

4. A process according to claim 1 wherein said feedstock is a cat cracker gasoline having a normal boiling range of about 75° to about 225° C.

5. A process according to claim 1 wherein said contacting is effected in a fixed bed of gamma alumina and the feedstock is passed over the catalyst at a liquid hourly space velocity (LHSV) of about 0.15 to about 15.

* * * * *